Oct. 12, 1943.          H. L. NICHOLS, JR                2,331,790
                      HYDRAULIC CONTROL VALVE
                      Filed Feb. 25, 1941              3 Sheets-Sheet 1
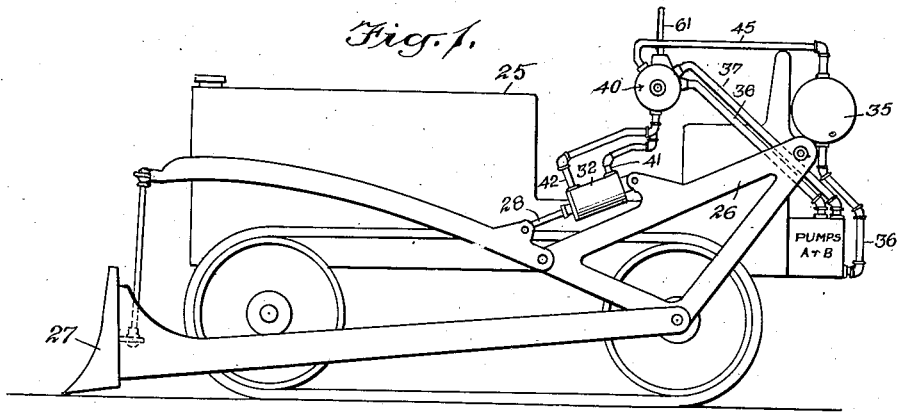
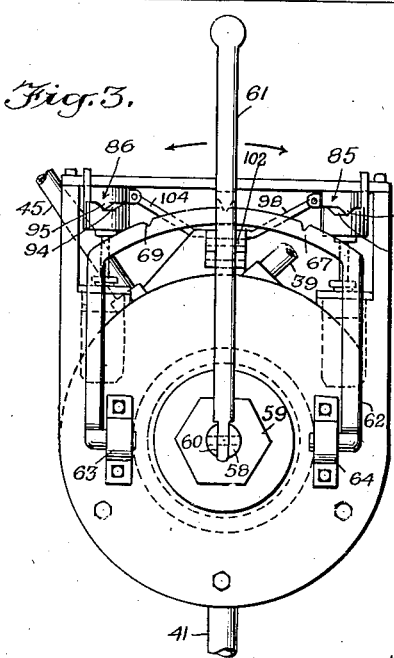
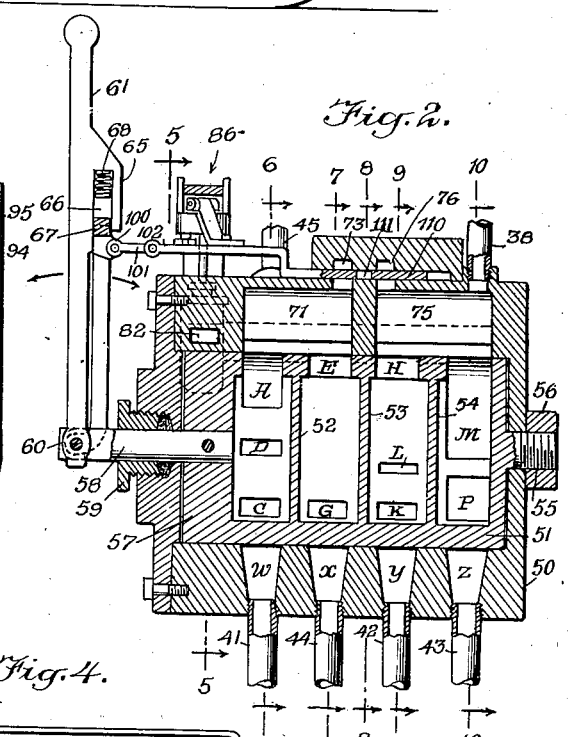
WITNESSES
INVENTOR
Herbert L. Nichols Jr.
BY
ATTORNEYS Oct. 12, 1943.   H. L. NICHOLS, JR   2,331,790
HYDRAULIC CONTROL VALVE
Filed Feb. 25, 1941   3 Sheets-Sheet 2

INVENTOR
Herbert L. Nichols Jr
BY
Munn, Anderson & Liddy
ATTORNEYS

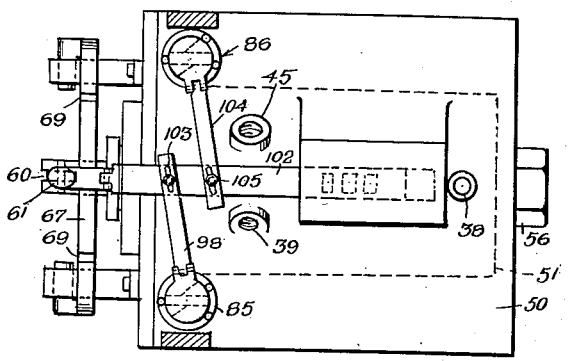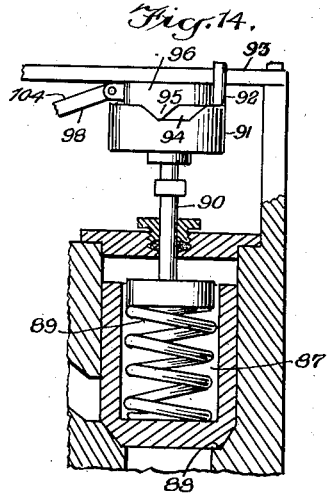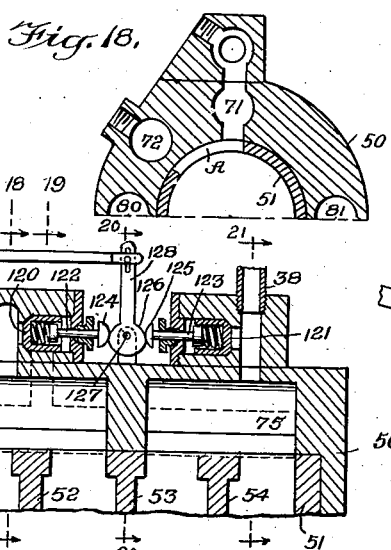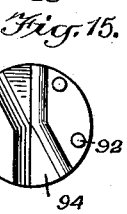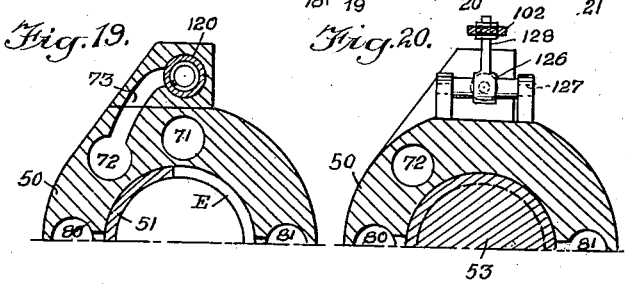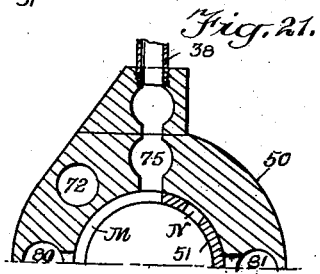

Patented Oct. 12, 1943

2,331,790

UNITED STATES PATENT OFFICE 2,331,790

HYDRAULIC CONTROL VALVE

Herbert L. Nichols, Jr., Greenwich, Conn.

Application February 25, 1941, Serial No. 380,509

9 Claims. (Cl. 60—52)

This invention relates to valves and more particularly to a valve of the type adapted to be inserted in a fluid power circuit to control the passage of the fluid.

A further object is to provide a valve which by the action of a single control lever may control the flow of fluid in several different courses and at different pressures at the same time.

My valve is particularly adapted for use with a series of pumps and cylinders containing pistons and while I have illustrated a particular use it will be understood that the principles of the valve may be adapted to many similar devices in which fluid power is used.

More particularly, an object of this invention is to provide a valve adapted to be used with a plurality of cylinders having pistons to control the passage of fluid through pipes leading to said cylinders above and below said pistons and adapted to actuate said pistons.

My invention is so constructed and actuated that an operator of a valve embodying the invention may, by the use of a single operating handle, selectively control the flow of fluid through the various pipes and cause the fluid to flow through various combinations of said pipes and to impede the flow through other pipes to move said pistons in the manner desired.

In the drawings I have shown my invention embodied in a valve adapted to control two pistons which, in turn, position the blade of a bulldozer. It will be appreciated, however, that by adding additional sections to the core of the valve it will be possible to control additional pistons and to selectively operate one or more of said pistons alone or in combination with others to produce the desired result. In the present embodiment four pipes only are involved and since in this embodiment the movement of one piston involves the movement of the other, a combination is provided controlling the passage of fluid to two of the four pipes at the same time, although the particular two pipes involved may be combinations of any two of the four pipes. In other words, fluid may be forced through the pipes to the tops of both cylinders at equal or different pressures in one combination, into the bottom of both cylinders in another combination, into the top of one and the bottom of another, or vice versa, and pressure may be forced into either end of either cylinder, and the exhaust from the opposite end of the other cylinder impeded as much or as little as may be desired.

In the accompanying drawings—

Fig. 1 is a view of a road grader or bulldozer to which my valve is adapted;

Fig. 2 is a vertical longitudinal cross section of the valve and controls;

Fig. 3 is an end elevation of the valve and control structure;

Fig. 4 is a diagram of the hydraulic system employed;

Figure 11:
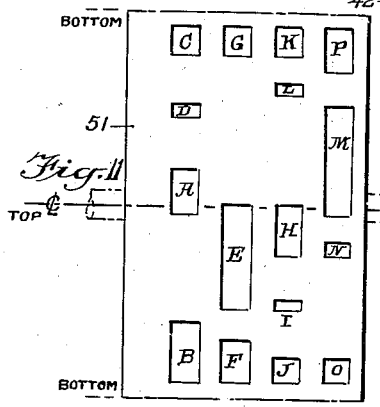
Figure 12:
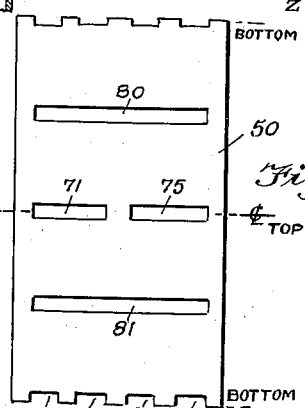

Figs. 5, 6, 7, 8, 9 and 10 are vertical cross sections taken on the lines 5—5, 6—6, 7—7, 8—8, 9—9 and 10—10, respectively, of Fig. 2;

Fig. 11 is a development of the outside of the valve core flattened out;

Fig. 12 is a development of the inside of the valve case flattened out;

Fig. 13 is a top plan view of the valve;

Fig. 14 is a vertical cross section of the lower valve shown in Fig. 13 on an enlarged scale;

Fig. 15 is a plan view of the cam or block forming part of the valve shown in Fig. 14;

Fig. 16 is a plan view of the actuating mechanism cooperating with the cam shown in Fig. 15;

Fig. 17 is a cross section of a view of the valve similar to Fig. 2 but showing a modified form of my invention;

Figs. 18, 19, 20 and 21 are vertical cross sections taken along the lines 18—18, 19—19, 20—20 and 21—21, respectively, of Fig. 17.

As will become apparent, one of the purposes of my invention is to control the passage of fluid into and from one or more of a number of selected channels. One application to which my valve may be put is illustrated in Fig. 1 where a conventional tractor or bulldozer 25 is shown. This device is provided with a frame 26 one each side thereof to which frame is pivotally mounted a scraper 27. In the operation of the scraper it is advantageous to be able to raise and lower the same and also to vary the angle of the scraper. This may be done by raising one side and lowering the other, or by merely lowering or raising one side. The position of the scraper 27 is controlled by the operation of two shafts 28 and 29. These shafts are connected with the frame 26 and have on their opposite ends pistons 30 and 31, respectively, enclosed in cylinders 32 and 33. It will be appreciated that by the operation of the pistons within the cylinders the height and angle of the scraper 27 may be varied.

Referring more particularly to Fig. 4, the system includes a tank 35 from which the pipe 36 leads to a pump designated as pump A and pipe 37 leads to a pump designated as pump B. Pumps A and B supply equal pressure through the pipes 38 and 39, respectively to a valve 40. From the valve 40, pipe 41 leads to the cylinder 32 above the piston, while pipe 42 leads from the valve to the cylinder 32 below the piston. Similarly from the valve, pipe 43 leads to the cylinder 33 above the piston, while pipe 44 leads from the valve to the same cylinder below the piston. It will be seen that the purpose of the valve 40 is to control the flow of fluid selectively through the pipes 41, 42, 43 and 44 and so operate the pistons 30 and 31 as to place the scraper 27 in the desired position. The passage of fluid through the pipes 41 and 43 into the cylinders 32 and 33 will force the pistons downwardly and thus tend to lower the scraper. The passage of fluid through the pipes 42 and 44 will cause the pistons to move upwardly to lift the frames 26 and scraper 27 connected therewith. It will be likewise apparent that the passage of fluid through the pipe 43 and through the pipe 42 will cause the piston 31 to move downwardly and the piston 30 to move upwardly to lower the right hand frame 26 and raise the left hand frame 26 to lower the scraper on one side and raise it on the other, and the reverse position of the scraper will be secured by the passage of fluid through the pipes 41 and 44. In addition to the pipes heretofore described, a return pipe or by-pass 45 runs from the valve back into the tank.

The valve 40 consists essentially of a case 50 and a hollow core 51. The core 51 is divided into chambers by partitions 52, 53 and 54 perpendicular to the longitudinal axis of the case. These chambers are provided with a multiplicity of ports through their outer curved surfaces. The case 50 has ports cut in its inner surface which are inward extensions of lateral passages or external pipe connections. The core 51 may be tapered slightly for adjustment purposes and it will be seen that the end 55 thereof engages a nut or collar 56 for adjustment. The opposite end of the core, 57, is fastened to a rod 58 which passes through the case and a packing gland 59. In the bifurcated end 60 of the rod 58 is pivoted the control lever 61 so that if the operating lever is moved to either side it will rotate the core 51, although it may be swung away from or toward the valve without rotating the core. As will hereinafter be explained, the rotation of the core governs the up-and-down motion of the blade while the movement of the operating member toward or away from the valve governs the tilt of the scraper or blade. A guide arc 62 is hingedly mounted in brackets 63 and 64, said brackets being on the same plane with the end 60 of rod 58, so that the guide arc may swing with the operating handle 61 without changing its relative position thereto. The operating handle 61 is provided with a bracket 65 carrying a shoe 66. The bracket 65 engages the upper portion 67 of the guide arc 62 and the shoe is adapted to engage, under pressure of the spring 68, depressions 69 in the guide arc 62.

As has been previously pointed out, the pipe 41 leads to the top of the right cylinder 32, pipe 42 to the bottom of the same cylinder, pipe 43 to the top of the left cylinder, and pipe 44 to the bottom thereof. The purpose of the valve is, therefore, to control the passage of oil through the respective pipes to operate the pistons in the cylinders and thus control the position of the blade.

Figure 5:
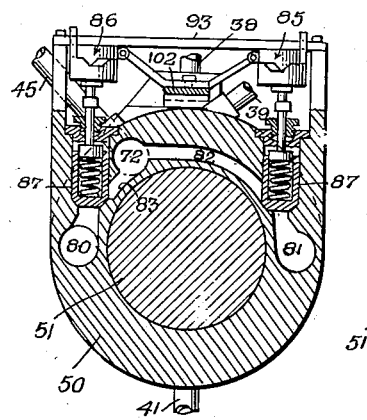
Figure 6:
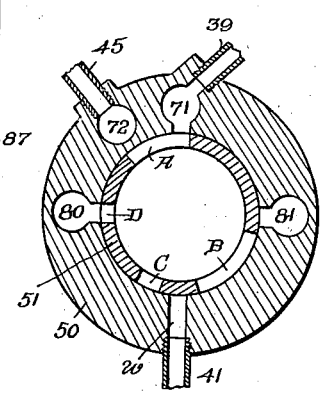
Figure 7:
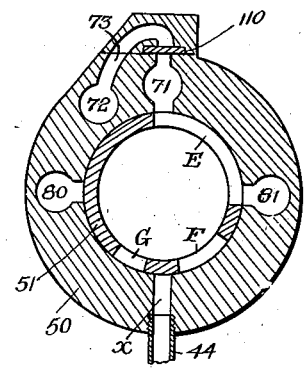
Figure 8:
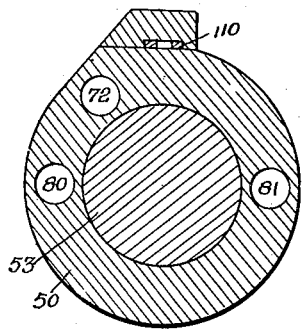
Figure 9:
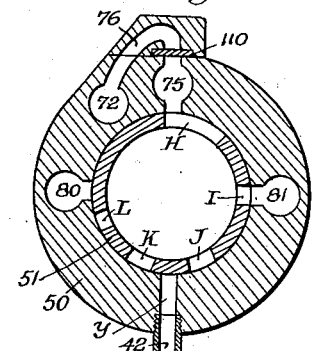
Figure 10:
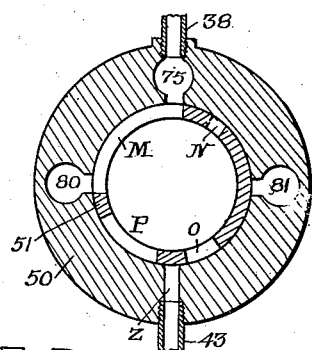

Referring to Figs. 6 to 10, it will be seen that Fig. 6 shows the portion of the core which controls the flow of oil through the pipe 41 to the top of the right cylinder and the section shown in Fig. 7 controls the flow of oil through the pipe 44 to the bottom of the left cylinder. In Fig. 9 the section controls the flow through pipe 42 to the bottom of the right cylinder, while in Fig. 10 the section controls the flow through pipe 43 to the top of the left cylinder. It will be noted that above the sections shown in Figs. 6 and 7, is a common chamber 71 from which the pipe 39 extends to pump B. These sections are also supplied with an exhaust chamber 72 which connects with the pipe 45 returning to the tank. Connecting the chamber 71 and the exhaust chamber 72 is a passage 73. The sections shown in Figs. 9 and 10 are likewise connected with a common chamber 75, which is connected to the exhaust chamber 72 by a passage 76. The pipe 38 in pump A leads to chamber 75.

Extending laterally throughout the valve case are lateral passages 80 and 81, which at the handle end of the valve are connected by passages 82 and 83 which lead to the exhaust chamber 72. The passage 82 is normally closed by a tilt valve 85 and the passage 83 is normally closed by a tilt valve 86. These valves are substantially identical and a detail view thereof will be found in Fig. 14.

The valves 85 and 86 consist of cups 87 which rest against the seats 88 by action of a valve spring 89. They are provided with adjusting rods 90 and have at the top of the rods a block 91 secured against rotation by pins 92 fixed in a plate 93. The blocks 91 are provided with widened grooves 94 on their upper surfaces. These grooves 94 are adapted to accommodate the bead 95 on a cam disk 96 to which is pivoted at 97 an arm 98 in the valve 85 and a similar arm 104 in the valve 86.

Pivotally attached to the guide arc 62 at 100 is an arm 101 which is, in turn, pivoted to a rod 102. To the rod 102 there is pivoted the arm 98 at 103 and the arm 104 at 105. It will be seen that the movement of the operating handle 61 toward or away from the valve will carry with it the guide arc 62 and will either pull or push the rod 102, thus moving the arms 98 and 104 and rotating the cam disks on the valves 85 and 86. The valves 85 and 86 are constructed and set to open on a very slight pressure when the bead 95 is resting in the groove 94. The action of the bead on the cam disks in the groove in the block is such that if the cam disks are rotated in a clockwise direction the bead 95 will attempt to climb out of the groove 94, thus exerting pressure on the cup 87 of the valve. If the cam disks are rotated in a counterclockwise direction the bead can rotate in the widened section of the groove without exerting any pressure against the block. It will be seen, therefore, that if the operating handle 61 and the guide arc 62 are moved away from the valve, the cam disk on the valve 86 will be rotated in a clockwise direction while the cam disk on the valve 85 will be rotated in a counterclockwise direction. This will tend to put additional pressure on the valve 86 while the valve 85 will be free from additional pressure. In the same manner, the opposite movement of the operating handle 61, that is, toward the valve, will rotate the cam disk on the valve 86 in a counterclockwise direction and the cam disk on the valve 85 in a clockwise direction, exerting additional pressure on the valve 85 while not affecting the valve 86. The valves 85 and 86 have a maximum setting which is substantially less than the pressure developed by the pumps A and B so that even though the valves are set under pressure, back pressures may be by-passed therethrough if sufficient pressure is built up.

It will be appreciated that the operating handle shown in Figs. 2 and 3 and the cores illustrated in Figs. 6, 7, 8 and 9 are shown in the hold position with the openings W, Y, Z and X to the pipes 41, 42, 43 and 44 closed. This will lock the oil in the pipes and cylinders and prevent movement of the pistons. In this position the ports A and E are open to chamber 71 and the ports H and M to chamber 75. The ports D and N communicate with the lateral passage 80 and the ports E and I communicate with the lateral passage 81, so that oil coming from both pumps and entering the ports A, E, H and M may pass through the ports D and N and E and I into the passages 80 and 81, through the valves 85 and 86 into the exhaust chamber 72 and through the pipe 45 back to the tank.

If the operating handle is moved all the way to the right, the core is turned and a float position is secured in which the openings W, X, Y and Z to the pipes 41, 44, 42 and 43 coincide with the ports B, F, J and O, respectively. Oil may pass into the core through the port A from the chamber 71 and through the port M from the chamber 75, and it may by-pass through the port P to the pipe 80 and through the port E to the pipe 81. In the float position, there being no pressure exerted in either of the cylinders 32 or 33, the blade will rest by its own weight on the ground.

If the handle is moved all the way to the left, another float position is secured in which the openings W, X, Y and Z to the pipes 41, 44, 42 and 43 coincide with the ports C, G, K and P, respectively, and fluid may pass from the chamber 71 through the port E and from the chamber 75 through the ports H and N. Fluid may also pass to the pipe 80 through the port M and into the pipe 81 from ports F and B. If the handle is moved only part way to the left, the core is rotated to the up position in which the openings W, X, Y and Z to the pipes 41, 44, 42 and 43 coincide with the ports C, G, K and P, respectively. Fluid may enter the two central sections of the core through the ports H and E and may pass from the exterior sections of the core into the pipe 80 through the port M and into the pipe 81 through the port B. In this position, there being no pressure on the valves 85 and 86, fluid from pipes 41 and 43 can exhaust freely and all pressure will be exerted through the pipes 44 and 42 to the bottom of each cylinder 32 and 33 to raise the blade. If the handle is moved half way to the right, oil may flow from chamber 71 through the port A and from chamber 75 through the port M into the exterior sections of the core, while the openings W, X, Y and Z to the pipes 41, 44, 42 and 43 will coincide with the ports B, F, J and O. The port E will be open to the passage 81, while port L will be open to passage 80 in the central sections of the core so that fluid in the sections will be by-passed back to the return pipe. This position will force all the fluid through the pipes 41 and 43, entering the cylinders 32 and 33 above the pistons and thus forcing the pistons downwardly, the displaced fluid flowing through pipes 42 and 44 to exhaust passages.

Attached to the rod 102 is a sliding member 110 forming a gate valve between the passages 73 and 71 and 76 and 75. The sliding member 110 is provided with an opening 111 so positioned that when the operating handle 61 and the guide arc 62 are moved away from the valve, the opening 111 will connect the passage 73 with the chamber 71, while when the operating handle and the guide arc are moved toward the valve the opening 111 will coincide with and connect the passage 76 with the chamber 75, but when the handle is centrally positioned, both will be closed. It will be seen, therefore, that when the operating handle 61 and the guide arc 62 are moved away from the valve, the passageway 73 will be opened and fluid coming from pump B will be free to pass through the pipe 39 into the chamber 71, through the passage 73 into the chamber 72 and out through the return pipe 45, back into the tank 35. Oil or fluid coming from pump A will not be by-passed since the sliding member 110 will close the passage 76. At the same time, the movement of the handle being away from the valve, a clockwise rotation of the cam disk on the valve 86 will take place, thus exerting additional pressure on the valve 86 which will require considerable pressure to open, so that pressure will build up in passage 80. It will be seen that by allowing the pressure to by-pass out of the chamber 71 through the passage 73 into the exhaust chamber 72, the pipes 41 and 44 will be robbed of their pressure, while the pipes 42 and 43 will continue to receive pressure from the pump A if the core should be so positioned.

This tilting operation may not be executed in the hold position when all the openings W, X, Y and Z leading to the pipes 41, 44, 42 and 43 are closed.

If the handle is in the left float position, oil returning through the pipes 41 and 44 passes through the ports B and F into the pipe 81, through the valve 85 into the chamber 71 and the exhaust pipe 45. While the port M will, at the same time, register with the pipe 80, it will be appreciated that pressure on the valve 86 will prevent the oil from being by-passed into the exhaust chamber, so a pressure depending on 86 will be supplied to pipes 42 and 43.

If the handle is in the other float position, that is, all the way to the right, oil returning through the pipes 41 and 44 will pass through the port E into the passage 81 and back to the tank, while the port P will register with the pipe 80 and pressure on the valve 86 will hinder oil in being by-passed therethrough. It will readily be understood that by moving the operating handle 61 toward the valve, passage 76 will be opened while passage 73 will be closed. The oil will be forced through the pipes 41 and 44, while the oil in the section of the core farthest from the handle 61 will be allowed to by-pass through the passage 76 into the exhaust passage 72. The valve 85 will receive additional pressure since its cam disk will be rotated in a clockwise direction and resistance will, therefore, be offered to oil attempting to by-pass through the passage 81 while oil will be free to by-pass through the passage 80.

It will be appreciated that while the foregoing description has dealt with various movements of the blade, only a single action was involved in each, that is, the raising and lowering of the blade or tilting it from one side or the other, while it rests by its own weight on the ground or other support. In addition, the scraper may be tilted while being raised or lowered. For instance, the operator may desire to raise the blade, and to simultaneously cause it to tilt with one end higher than the other. By placing the operating handle in the up position, fluid will be formed through the two central sections of the core to the bottoms of the cylinders, and the tops of the cylinders will be exhausted, as previously described. Now, if the operating handle is moved toward the valve, the pressure from pump A will be by-passed through chamber 75 and the gate valve port 111 to exhaust passage 72, causing a cessation of the pressure which would otherwise by delivered from 75 through ports H, K and Y and pipe 42 to the bottom of cylinder 32. At the same time, the clockwise movement of bead 95 in groove 94 will increase the tension on tilt valve 85, impeding the escape of fluid from the top of cylinder 32 through pipe 41, ports W, C and B and passage 81, said impediment becoming greater as the operating handle is moved further from the perpendicular. The top of cylinder 33 will continue to exhaust unimpeded through pipe 43, P and M and passage 80. The result of these various actions is that the scraper blade is pushed up on the side of cylinder 33 and is impeded in its upward movement by a lesser back pressure or resistance in the top of cylinder 32. The piston in cylinder 33 will, therefore, rise until the torsion of the blade, twisted in this manner, is sufficient to create enough pressure in the top of cylinder 32, and so in passage 81 to displace the tilt valve 85 from its seat. The blade will then rise in this tilted position.

If the operating lever is kept inclined toward the valve, and is rotated into the down position, pump B will now exert pressure on the top of cylinder 32, through passage 71, ports A, B and W and pipe 41. Pump A is still by-passed as described above. The exhaust from the bottom of cylinder 33 through pipe 44, ports X, F and E and passage 81 is obstructed by the tilt valve 85. The effect of this downward pressure diagonally opposed by a lesser resistance will again be to cause the blade to twist until the tilt valve 85 is opened, after which the blade will descend in this tilted position. It will be noted that the amount of tilt in each case is determined by the rigidity of the scraper tending to keep it level, and the resistance of the tilt valve tending to twist it. Since the rigidity of the scraper is a constant, the amount of tilt is directly dependent on the degree that the operating lever is moved out of the perpendicular. It will be noted that if this inclination is kept constant, the lever can be rotated from up to down positions without changing the tilt. In the hold position the closing of the cylinder ports will lock the blade in any tilted position.

If it were desired to tilt the blade oppositely, the operating handle could be moved away from the valve, with the result that the pressure of pump B would be by-passed through chamber 71, port 111, passages 73 and 72 and pipe 45. In the up position pressure would be delivered only to the bottom of cylinder 32, through chamber 75, ports H, K and Y and pipe 42. The top of this cylinder would exhaust through pipe 41, ports W, C and B into passage 81, past tilt valve 85, which is released in this position of the operating lever through passages 82 and 72 to pipe 45. The top of cylinder 33, however, exhausting through pipe 43, ports Z, P and M into passage 80, will encounter the resistance of tilt valve 86 now subjected to compression by the clockwise cylinder 33 is released through pipe 44, ports X, G and E, chamber 71, passages 73 and 72 and pipe 45. We therefore have again the situation of an upward pressure diagonally opposed by a lesser resistance. The scraper blade will therefore twist with the end governed by cylinder 32 higher, and in this twisted or tilted position will rise.

Now if the operating lever, while still positioned away from the valve, is rotated into the down position, pressure will be supplied to the top of cylinder 33 from pump A through passage 75, ports M, O and Z and pipe 43. The bottom of this cylinder would be released through pipe 44, ports X, F and E and passages 81, 82 and 72, while the exhaust of the bottom of cylinder 32 through pipe 42, ports Y, J and L into passage 80 is impeded by tilt valve 86, so that resistance is set up to the downward movement of the blade, causing it to twist. The top of cylinder 32 can draw fluid from chamber 71, through ports A, B and W, and pipe 41, to fill any vacuum created by the upward movement.

The pressure system of each pump may be provided with a relief valve to by-pass undue pressures or to equalize the system. These valves may be mounted on the pumps, in the lines, or on the inlets to the rotary valves, but since they are conventional in design they form no part of this invention and they have not been illustrated.

In the modification shown in Figs. 17 to 21, inclusive, the structure is substantially identical except that relief valves 120 and 121 are each positioned horizontally at the top of the case 50 with their adjusting rods 122 and 123 pointed toward each other. The ends of these rods are threaded into rounded ends 124 and 125 which are pressed by the springs against the central cam member 126 which is rotatably mounted on a pin 127 and fastened to a rod 128. The rod 128 is pivotally fastened to the arm 102. It is intended that these relief valves be so constructed and adjusted that when the operating lever is set they will open at equal pressures, substantially lower than the pumps are capable of developing, and that the by-passed fluid will be returned to the tank through passage 72 and pipe 45. It will therefore be seen that the effective working pressures in chambers 71 and 75 depend on the position of the cam 126, which in turn is dependent on the position of the guide arc 62 and the operating lever. If the control member is moved toward the valve the cam member 126 will be caused to rotate on the pin 127 so as to increase the tension of the spring in the valve 120 by pushing against the rod 122 and will release the adjusting rod of valve 121 somewhat, so that oil from the chamber 75 may more readily by-pass through the valve 121. With this structure it will be seen that the further the operating handle is pushed toward the valve the greater will be the pressure exerted on the valve 120 and the less on the valve 121.

As an example of operation of this modification, if it is desired to raise the scraper with the side controlled by cylinder 33 higher, the operating lever will be rotated into the up position and inclined toward the valve. This inclination will cause tilt valve 85 to impede exhaust from passage 81, as previously described. It will also reduce the pressure of valve 121 against its seat, allowing fluid more readily to escape past it into passage 72, thus reducing the pressure in chamber 75, while it will increase the pressure of valve 120 against its seat, increasing the pressure in chamber 71.

Now the high pressure from chamber 71 may go through ports E, G and X and pipe 44 to the bottom of cylinder 33, while the lesser pressure from chamber 75 will be transmitted through ports H, K and Y and pipe 42 to the bottom of cylinder 32. This lesser pressure will be opposed by the passage of fluid from the top of cylinder 32 through pipe 41, ports W, C and B and passage 81 being impeded by the tilt valve 85, while the top of cylinder 33 can freely exhaust through pipe 43, ports Z, P and M and passages 80, 83 and 72. The result of this will clearly be that the blade will rise with the side controlled by cylinder 33 high. Other actions of raising, lowering and tilting the scraper will follow the pattern outlined for the basic form of the valve.

In this modification, it will be noted that instead of one pump being entirely by-passed by sideward motion of the operating lever and guide arc, the pressure from it is reduced, while the available pressure from the other pump is increased. The effect on tilting and movement of the blade is the same, but the transition from level to tilted operation is smoother, and operation in a tilted position is steadier and more powerful.

It will be noted that in either of the forms herein described the operator is in complete control of the up-and-down motion of the blade by moving the operating lever 61 from left to right on the arc 62 and that the supply from the two pumps will tend to keep the blade more positively level than with the usual one pump system. In addition, by moving the same control lever toward or away from the valve the operator has complete control of the tilt of the blade and yet retains his ability to move it up or down while in the tilted position. The result of these advances is not only the elimination of the troublesome job of mechanically changing the tilt of the blade for different types of work, but enables a machine so equipped to operate in boulder-infested terrain, on side hills, near walls, and in materials of uneven resistance with a flexibility and steadiness not heretofore possible with this type of machinery. It also makes possible the construction of new types of trail-builder frames in which the resistance to torsion can be left to hydraulic control.

I claim:

1. In a hydraulic control valve adapted to selectively control the passage of oil to any two of four outlets, a casing, a core in said casing, a supply passage in said casing at the top thereof, an exhaust passage laterally extending through said casing, a series of outlet passages each communicating with one of said four outlets, lateral passages on either side of said casing, a passage communicating with each of said lateral passages and with said exhaust passage, valves controlling each of said lateral passages, ports in said core adapted to register with said supply passages, said outlet passages and said lateral passages when said core is rotated, and an operating handle for rotating said core and for controlling said valves in said lateral passages.

2. In a valve for a hydraulic system, a casing, a plurality of pipes leading from said casing, a plurality of pumps each leading to separate chambers in said casing, an exhaust chamber in said casing, an outlet from each of said first-mentioned chambers to said exhaust chamber, a valve controlling said outlet, lateral passages in said casing communicating at one end with said exhaust chamber, valves controlling said lateral passages, a core in said casing, ports in said core, said ports being so arranged that when said core is rotated said ports will communicate with certain of said chambers and pipes, and a single control handle for rotating said core and selectively operating each of said aforementioned valves.

3. In a valve for a hydraulic system, a casing, a hollow partitioned core in said casing, ports in said core, an exhaust passage in said casing, lateral passages in said casing communicating at one end with said exhaust passage, valves controlling communication between each of said lateral passages and said exhaust passage, inlet chambers in said casing, each of said inlet chambers communicating with a definite section of said core, a passage communicating with each of said inlet chambers, a valve in said passage, an operating handle for rotating said core to selectively register the ports in the core with said passages and chambers, and means connected with said operating handle for the selective operation of each of said valves.

4. In a device of the character described, a casing, a hollow partitioned core in said casing, inlet and outlet ports in said casing, an exhaust passage in said casing, lateral passages in said casing communicating at one end with said exhaust passage, said core having ports therein complemental to said inlet and outlet ports, exhaust and lateral passages, valves controlling the communication between said lateral passages and said exhaust passage to impede the return flow of fluid to build up pressure, each of said valves including an operating rod, a block on said operating rod, a groove converging near its middle in said block, a disk having a bead in said groove whereby said bead when said disk is rotated in one direction will move within said groove in order not to interfere with its impeding action and when rotated in the other direction will exert pressure upon said block to shut the valve, and means for rotating said disk.

5. In a valve for a hydraulic system, a casing, a hollow partitioned core in said casing, ports in said core, an exhaust passage in said casing, lateral passages in said casing communicating at one end with said exhaust passage, valves controlling communication between each of said lateral passages and said exhaust passage, inlet chambers in said casing, each of said inlet chambers communicating with a definite section of said core, a passage communicating with each of said inlet chambers, a valve in said passage, an operating handle for rotating said core to selectively register the ports in the core with said passages and chambers, and means connected with said operating handle for the selective operation of the last-mentioned valve and one of said valves in said lateral passages.

6. In a control valve for use in a liquid pressure system having a pair of cylinders, a casing, flow connections between the opposite ends respectively of each of the cylinders and the interior of said casing, a core having rotary movement in said casing, said casing having a series of inlets for the inflow of liquid under pressure thereinto, an outlet for the return flow of liquid therefrom, a series of ports and passages communicating with said inlets and outlet, respectively, said core having a series of ports therein which cooperate with said flow connections, said inlet ports and said passages in said casing, retarding valves in certain of said passages communicating with said outlet, a single control member connecting with said core and adapted to rotate said core, and means on said control member to operate said valves in said passages and said core so that ports therein will cooperate with said ports and passages in the casing upon the manipulation of said control member whereby liquid may flow into one end of both of said cylinders and flow out the other end of said cylinders simultaneously, and vice versa, and also whereby liquid may flow into the upper end of one cylinder and out its lower end while the outflow of liquid from the other cylinder is throttled, to supply pressure to one side of the piston in one cylinder and cause said piston to drag with it the piston in the other cylinder.

7. In a control valve mechanism for use in a liquid pressure system having a pair of cylinders, a casing, flow connections between the opposite ends respectively of each of the cylinders and the interior of said casing, a core member adapted to be rotated in said casing, said casing having a series of inlets for the inflow of liquid under pressure thereinto, an outlet for the return flow of liquid therefrom, a valve member connecting said inlets with said outlet, a series of passages connecting with said outlet, retarding valves in certain of said passages communicating with said outlet, said core having a series of ports therein which cooperate with said flow connections, said inlet ports and said passages in the casing upon the rotation of said core, a single control member connected to rotate said core and actuate said valve member and retarding valves to control the flow of liquid whereby liquid may flow into one end of both of said cylinders and flow out the other end of said cylinders simultaneously, and vice versa, and also whereby liquid may flow into the upper end of one cylinder and out its lower end while the outflow of liquid from the other cylinder is throttled, to supply pressure to one side of the piston in one cylinder and cause said piston to drag with it the piston in the other cylinder.

8. In a control mechanism for a liquid pressure system, a casing having a pair of inlet ports, outlet ports and return flow passages, a rotatable hollow partitioned core having ports therein complemental to said inlet and outlet ports and return flow passages, a slidable valve member having a port therein carried by said casing, and means connected with said core and valve member to set them to form paths for the flow of liquid from either of said inlet ports selected to and out through certain of said outlet ports while also by-passing liquid from either non-selected inlet port to said return flow passages, said means consisting of a single control element manually operable and connected to the core and valve member respectively so that the control element may be swung laterally in opposite directions to impart rotary movement to the core to set it and also that the control element may be moved to and fro to slide the valve member to set it.

9. Pressure control mechanism including a main valve through which liquid may flow from two inlets to four outlets, said valve having a return flow outlet, a control element mounted for pivotal movement in planes at right angles to each other, said valve being operated by the movement of said element in one plane, a second valve means normally operable to impede the return flow of liquid from two of said outlets to said return flow outlet, said second valve means being connected with said element to be operated thereby to restrict the return flow when said element is moved in its second plane, and a third valve means operated by said element upon movement of the latter in the second plane to by-pass liquid from either one or the other of said inlets to said return flow outlet.

HERBERT L. NICHOLS, Jr.